Patented June 11, 1929.

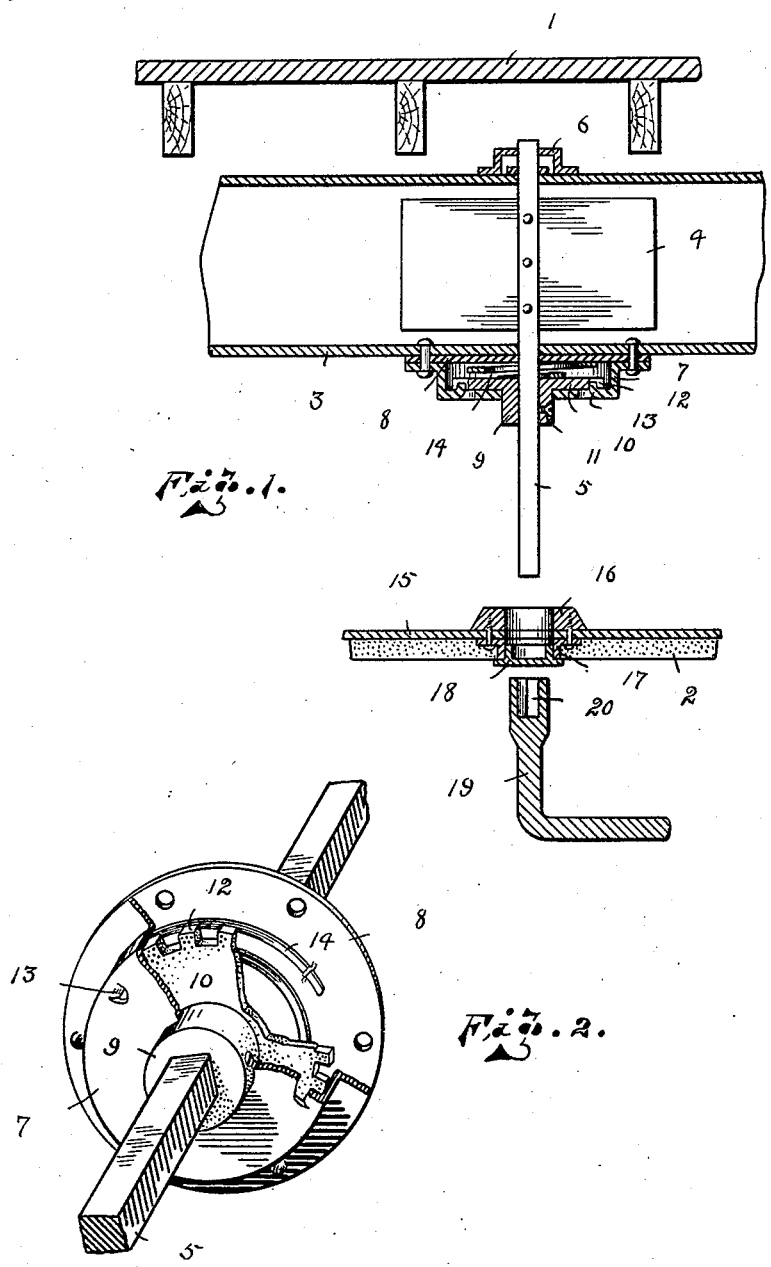

1,716,444

UNITED STATES PATENT OFFICE.

WALKER JAMAR, OF DULUTH, MINNESOTA.

DAMPER LOCK.

Application filed February 2, 1928. Serial No. 251,346.

This invention pertains to damper controlling means and has special reference to a novel form of such device particularly adapted for the control of dampers in blind or enclosed air conduits, such as used in the ventilation of school houses and the like.

The principal object of the invention is to provide a simple and practical device and means for access to same as inconspicuous as possible, and other advantages of the combination will appear in the further description of same.

Referring now to the accompanying drawing, forming part of this application, and wherein like reference characters indicate like parts:

Figure 1 is a vertical sectional view through an inclosed conduit, the damper of which is equipped in a manner to embody the invention; and Figure 2 is a perspective view of the most essential part of the controlling mechanism.

1 represents the floor of a building, and 2 the downwardly spaced ceiling of the room below, while 3 indicates a rectangularly shaped air conduit having the pivotally mounted damper 4 therein. In my preferred construction the damper 4 is mounted directly upon the squared shaft 5, which is of uniform size throughout and extends completely through the conduit, being journalled as at 6 in any desired manner above the conduit and encircled beneath the conduit by the circular housing 7, said housing being mounted upon a circular base plate indicated at 8. The housing 7 is provided with an abnormally large axial opening about the shaft 5 and through which opening extends the hub 9 of the control disc 10; this disc and hub being integral, and the hub forming the means of union to the shaft as for example by the set screw 11, so that when the shaft is raised or lowered axially the control disc 10 will likewise be raised or lowered. This disc is provided with notches and teeth about its entire circumference, said teeth being indicated at 12 and the notches existing therebetween.

Two opposite lugs or spurs are indicated at 13, they being struck from the face of the housing 7 in such a manner as to occur within opposite notches about the disc 10 when in its lowermost position. As is obvious when the disc is raised by the raising of the shaft 5 these notches will become freed from the lugs 13 and permit of any desired rotation of the shaft 5, while when the latter is lowered the disc also will be lowered and the lugs engaged within the notches, thus preventing any rotation of the shaft after having once been set.

To assist in holding the disc in such engaged position there is installed preferably a flat helical spring 14 intermediate of the upper face of the disc and the base plate 8 of the housing, thus making a very compact and complete unit for the control of the damper shaft.

Now another novel feature of the combination and assembly is that the shaft 5 is terminated some little distance above the ceiling 2 and beneath the conduit, and the device is so arranged as to avoid the necessity of there being particular attention to such spaced relation of the lower end of the shaft and the ceiling, this being a material convenience in the installation of the conduits as it is thereby only necessary for the party installing same to know approximately where the line of the ceiling will occur, when he may leave the installation of the conduit shafts in a finished condition prior to the construction of the ceiling.

15 represents the position of the lath of the ceiling and which may be either of metal or wood as preferred and upon which may or may not be installed a reinforcing block 16 having a central hole therethrough providing access to the end of the shaft 5, and to this block, as well as through the lath is attached in any desired manner the thimble or grommet 17 which is provided with a suitable friction cap or closure 18; the thimble 17 preferably being installed before the plaster is laid upon the ceiling.

The L-shaped operating wrench is indicated at 19, one end being provided with a suitable socket 20 which may be extended through the hole in the ceiling after the cap 18 is removed and engage the end of the shaft 5 which as is obvious may be first raised and then turned to any desired position, and then dropped when the adjustment is concluded, the wrench removed and the cap replaced in the ceiling.

From the foregoing it is evident that I have devised a very simple and practical installation for such a damper control and one that is only recognizable from the interior of a room by the insignificant cap 18 installed within the wall or ceiling of the room.

Having thus described my invention, what I claim and desire to secure by Letters Patent, is:

1. The combination with a conduit spaced from the wall of a room and having a damper therein, of a shaft upon which the damper is attached extending through the conduit towards the wall but spaced therefrom, a grommet within the wall opposite the shaft, and a removable closure for said grommet.

2. The combination with a conduit of the class described having a damper therein the operable shaft of which extends outwardly of the conduit, of control mechanism for said shaft comprising a housing thereabouts attached to the conduit, a disc within the housing fixed to the shaft, cooperative selective means carried by the disc and housing whereby to anchor the shaft in any predetermined rotative position, means for maintaining said anchored position, and means permitting rotation and reciprocation of the shaft for the purpose described.

3. The combination with a spaced floor and ceiling structure having a conduit therein and a damper therefor, of a damper shaft journalled within the conduit and extending towards but spaced from the ceiling, a grommet within the ceiling and positioned in spaced axial relation to an end of the shaft, and a removable closure for the grommet.

4. The combination with a spaced floor and ceiling structure having a conduit therein and a damper therefor, of a damper shaft journalled within the conduit and extending outwardly therefrom, a rotatable notched damper control element attached to the shaft, and fixed means for selective registration with the notched disc to prevent rotation thereof.

In testimony whereof I affix my signature.

WALKER JAMAR.